United States Patent [19]

Emmett et al.

[11] 4,197,352
[45] Apr. 8, 1980

[54] COMPOSITE FRICTION ASSEMBLIES AND METHODS OF MAKING SUCH ASSEMBLIES

[75] Inventors: John E. Emmett, Farmington, Mich.; James R. Gregson, Brussels, Belgium

[73] Assignee: Hooker Chemicals & Plastics Corp., Niagara Falls, N.Y.

[21] Appl. No.: 863,554

[22] Filed: Dec. 22, 1977

[51] Int. Cl.² .................. F16D 69/02; F16D 69/04; B32B 27/42

[52] U.S. Cl. .................. 428/409; 188/251 A; 192/107 M; 156/244.26; 156/244.27; 156/245; 264/250; 264/255; 428/325; 428/328; 428/443; 428/446; 428/454; 428/525

[58] Field of Search .................. 260/38, DIG. 39; 264/250, 251, 255; 156/306, 242, 245, 244.26, 244.27; 428/409, 525, 325, 328, 443, 446, 454; 188/251 A; 192/107 M

[56] References Cited

U.S. PATENT DOCUMENTS

| | | | |
|---|---|---|---|
| 1,781,074 | 11/1930 | Norton | 260/DIG. 39 |
| 1,851,087 | 3/1932 | Denman | 260/DIG. 39 |
| 2,137,986 | 11/1938 | Sanford | 264/255 |
| 2,149,483 | 3/1939 | Whitelaw | 264/250 X |
| 2,369,502 | 2/1945 | Walker | 106/36 |
| 2,686,140 | 8/1954 | DeGaugue | 428/328 X |
| 3,241,391 | 3/1966 | Borro et al. | 74/445 |
| 4,042,085 | 8/1977 | Bjerk et al. | 192/107 M |
| 4,044,188 | 8/1977 | Segal | 428/409 X |
| 4,098,943 | 7/1978 | Degginger et al. | 428/409 X |
| 4,117,185 | 9/1978 | Cummins et al. | 428/454 X |
| 4,119,591 | 10/1978 | Aldrich | 188/251 A |

FOREIGN PATENT DOCUMENTS

| | | |
|---|---|---|
| 1347812 | 11/1963 | France . |
| 399738 | 11/1933 | United Kingdom . |
| 1019341 | 2/1966 | United Kingdom . |
| 1040225 | 8/1966 | United Kingdom . |
| 1195114 | 6/1970 | United Kingdom . |

*Primary Examiner*—Harold Ansher
*Attorney, Agent, or Firm*—Peter F. Casella; James F. Mudd

[57] ABSTRACT

The present invention relates to composite friction assemblies and to methods of making the assemblies. The assemblies include at least one friction member and a support member. The friction member is formed from a mixture of thermosettable phenol-aldehyde resin and filler material under conditions less than those which would thermoset the resin component. The preformed friction member is joined to the support member by molding a mixture of phenol-aldehyde resin and filler material in a mold cavity which utilizes a face of the preformed friction member as a portion thereof. The molding conditions are such that the resin component of the members are commonly cured, or thermoset, to produce a composite friction assembly.

19 Claims, No Drawings

COMPOSITE FRICTION ASSEMBLIES AND METHODS OF MAKING SUCH ASSEMBLIES

BACKGROUND OF THE INVENTION

The present invention relates to composite resin articles or assemblies and to methods of producing composite resin articles or assemblies wherein at least one component or member is separately preformed and subsequently molded with and to another component or member. The articles of the present invention are particularly adapted to uses wherein one portion of the article requires functional properties that are not required by the other portions. The present invention is particularly adapted to the production of composite friction assemblies, such as brake or clutch assemblies.

Phenolic resin molding compositions are well known in the art. Generally, such compositions consist of a phenol-aldehyde resin blended with various filler materials. The molding compositions are prepared by blending a one- or two-step phenol-aldehyde resin with filler materials. The mixture may then be worked, i.e., heated to from about 150° to about 200° C. while being rolled between hot rolls, allowed to cool, ground and sized to produce the resin product. Alternatively, the mixture may be fed into a heated screw extruder and extruded through a narrow orifice and the product comminuted to produce a nodular molding resin composition.

The phenol-aldehyde resin may be made from phenols, such as phenol, m-cresol, m,p-cresol mixtures, cresylic acid, mixtures of phenol and cresylic acid, xylenol, resorcinol, bisphenol A, or any other phenol which will form thermosetting resins with aldehydes. Suitable aldehydes, for example, are formaldehyde, acetaldehyde, benzaldehyde, furfural, propionaldehyde, glyoxal, acrolein, and crotonaldehyde. The preferred thermosetting resin is phenol-formaldehyde resin.

The phenol-aldehyde resins useful in the present invention may be one- or two-stage resins. If less than one mole of the aldehyde is reacted per mole of phenol, the resin is commonly called a novolac, or two-stage resin. A novolac mixture is generally further processed by grinding and blending with an external cross-linking agent, such as hexamethylenetetramine, to produce a thermosettable resin composition that becomes infusible at elevated temperatures. Generally, a range of aldehyde to phenol in a novolac resin is between about 0.5 and about 0.9 mole of aldehyde per mole of phenol, and, more preferably, the range is between about 0.6 and about 0.8. If more than one mole of aldehyde per mole of phenol is utilized, a one-stage, or resole, resin is produced. Such mixtures become infusible by exposure to elevated temperatures. Generally, the mole ratio of aldehyde to phenol in this type of resin is between about 1.1 to about 3.0, and, more preferably, between about 1.5 and about 2.5.

The thermosettable resin compositions suited to form the matrix of the assemblies of the present invention may be either one-stage or two-stage resins, or mixtures thereof, the only criteria being that the resins utilized in separate members be compatible, e.g., that they may be commonly cured or thermoset under relatively the same conditions of temperature and time.

Filler materials utilized in the present resin compositions may be organic or inorganic. Filler materials are added, primarily, to enhance the properties of the final molded product, and, secondarily, to utilize a less expensive material in place of the more expensive resin material. Examples of inorganic filler materials are metals and metal oxides, asbestos, clay, silica, chopped fiber glass, calcium carbonate, minerals, e.g., wollastonite, talc and quartz, coal, mica, and carbon black. Examples of organic filler materials are rubber, wood flour, cloth fibers, rag pulp, wool and cotton flock. The characteristics of the final cured product, for example, structural strength, electrical conductivity, moisture resistance, heat resistance, wear resistance, thermal expansion and conductivity, may be advantageously modified or improved by the choice and amounts of filler materials.

Although the choice of filler materials is broad, the amount of filler materials usually included in resin molding compositions, those compositions useful to produce molded articles of complex shapes, is limited due to the increased viscosity (decreased flowability) of the composition as the amount of filler material is increased. Usually, the total amount of filler material in molding compositions ranges from about 20 to about 70 percent by weight of the composition. The maximum amounts of filler material included in molding compositions may be increased to about 80 percent by the use of processing aids which lower the viscosity of the composition. However, compositions with a filler material content above about 70 percent are usually extruded and molded into complex shapes only with difficulty.

Resin compositions having a loading of 90 percent or more by weight are useful in many applications, the amount of filler material being limited by the cohesiveness and structural strength desired in the final cured product. Such compositions are not considered moldable in the same sense that the molding compositions discussed above are moldable to produce articles of complex shape. However, such compositions may be formed or molded into simple shapes using straight, positive molds and applying the forming pressure directly to the composition. The friction member of the present invention contains a relatively high loading of filler material, from about 70 to about 90 percent by weight, and is suitably formed in this manner. The support member of the present invention is suitably fabricated of conventional molding compositions to facilitate the forming of support members with more complex shapes.

The phenol-aldehyde resin component generally comprises from about 10 to about 60 percent by weight of the composition. Generally, conventional molding compositions utilize a range of from about 20 to about 50 percent by weight. Usually, less than about 10 percent by weight resin does not yield a product having a cohesiveness required for most applications. A product having a resin content of over about 60 percent by weight usually does not have acceptable physical properties, e.g., hardness, thermal conductivity or wear, and is not economically competitive with compositions containing larger amounts of filler materials.

In practice, the molder usually selects the most appropriate molding composition for the article and utilizes that composition to mold the entire article. The present invention allows the molder to utilize separate resin compositions for separate components of the article and subsequently cure the components together to form a composite article.

GENERAL DESCRIPTION OF THE INVENTION

The present invention relates to composite friction assemblies which are comprised of at least one friction member and a support member, and to methods of producing such assemblies. The friction member and the support member are comprised of appropriate mixtures of thermosettable phenol-aldehyde resin and filler material. The friction member is initially formed or shaped under conditions less than those conditions which would thermoset or cure the resin component, i.e., the resin component may subsequently, in a later step, be substantially completely thermoset or cured. The preformed friction member is joined, along at least one surface, to a support member by molding the support member from a mixture of phenol-aldehyde resin and filler material, in a mold cavity which utilizes a face of the preformed member as a portion thereof under molding conditions to commonly cure the resin component of both members.

The resin compositions utilized in the present assemblies are, preferably, phenol-aldehyde resins and are suitably selected from those known in the art and discussed above. The criteria is that the resin compositions selected for the various members must be compatible, that is, that they must thermoset or cure under relatively the same conditions to form the composite assemblies of the present invention. Phenol-aldehyde resins are generally compatible with each other. A preferred resin for use is phenol-formaldehyde resin.

The filler material is selected to be appropriate to the function of the member in the composite assembly. Thus, the friction member may be fabricated of from about 40 to about 90 percent by weight of metal, suitably in the form of powder, particles or wire, to give a friction surface, while the support member may be fabricated of a resin composition containing appropriate filler materials to give higher structural strength.

The present invention is particularly adapted to the production of unitary, brake or clutch assemblies wherein the assemblies are a composite of a friction member and a support member.

Although the present invention will be described in terms of a single friction member, and that is a preferred mode for many applications, it will be appreciated that a plurality of friction members may be utilized in the same manner as that described herein for the use of one, and that the present invention encompasses a composite assembly having more than one friction member joined to a single support member.

DETAILED DESCRIPTION OF THE INVENTION

The friction member of the present assembly is fabricated from thermosettable phenol-aldehyde resins containing a relatively high loading, usually from about 70 to about 90 percent by weight, of filler material. Preferably, the filler material is predominantly (greater than 50 percent by weight) metallic or asbestos, suitably containing metals in the form of powder, particles or wire, to provide a friction bearing surface.

The support member is fabricated from a thermosettable phenol-aldehyde resin containing a relatively lower loading, usually less than 70 percent by weight, or, with the addition of processing aids to lower the viscosity, less than 80 percent by weight, of filler material. The support member is suitably comprised of a composition which will facilitate the molding of more complex shapes. The support member is desirably molded to include holes or other structural characteristics for holding or affixing the assembly to other parts of the system in which it is utilized.

The composite assemblies of the present invention are produced by initially charging a straight side, positive mold having the shape of the friction member with an appropriate amount of resin-filler mixture. The mold may suitably be heated to a temperature slightly above the flow temperature of the resin, usually between about 160° C. and about 180° C. A relatively high pressure, usually between about 30,000 psi and about 50,000 psi, is exerted on the mixture to form it to the mold. A time between about 2 and about 10 seconds is usually adequate to form the friction member.

The preformed friction member is retained secure in the mold in order to prevent the subsequent migration or flow around the friction member of resin from the molding composition that will subsequently be used to form the support member. Such migration may have a deleterious effect on the friction bearing surface of the friction member.

The mold containing the preformed friction member is opened to expose one surface of the friction member. The exposed surface is utilized as a portion of the internal face, or mold cavity of a second or supplemental mold having the capacity of the support member. The mold containing the preformed friction member may suitably be shuttled or rotated to align the exposed face of the friction member with the second portion of the mold that forms the support. It is then charged with an appropriate amount of resin molding composition and the support member molded under conditions which thermoset, preferably simultaneously, the resin component of both members. The members are thus joined along at least one surface by a common area of thermoset resin. The result is a composite friction assembly comprised of a friction member permanently bonded to a support member.

The composite assemblies are eminently suited to use as brake and clutch assemblies.

In one mode of the present invention, a composite vehicular brake assembly is produced. The composite assembly consists of a pad, or friction member, and a backing plate, or support member. In such mode, the friction member is generally fabricated of from about 10 to about 30 percent by weight of phenol-aldehyde resin with a filler material that is predominantly metal in the form of powder, particles or fine wire. Usually, the composition contains between about 50 to about 60 percent by weight metal and from about 20 to about 30 percent by weight of other filler materials to lend cohesiveness, thermal stability and strength to the friction member.

The friction member is formed, using a straight side, positive mold at a pressure between about 20,000 and about 50,000 psi, applied for a period of between about 2 and about 10 seconds. The formed friction member is retained in the mold, and one face of the friction member is utilized as a portion of the mold cavity of a second or supplemental mold having the capacity of a support member. The second mold is then charged with sufficient nodular phenol-aldehyde molding composition to mold the support member. Suitably, the molding composition contains between about 20 and about 50 percent phenol-aldehyde resin, about 20 to about 40 percent wollastonite, about 10 to about 20 percent cotton flock, about 5 to about 15 percent chopped glass fiber, and about 5 to about 10 percent processed mineral fiber to lower the viscosity of the composition.

Preferably, the mold is preheated to a temperature between about 160° C. and about 180° C. A pressure of between about 4,000 and about 50,000 psi is applied for a period of between about 2 and about 6 minutes. The mold is then opened and the composite brake assembly removed.

The composite brake assembly may be subsequently baked to stabilize the assembly, i.e., to remove any solvents or other volatiles that may have been included in the resin component or in the filler material. Baking times from about 9 to about 15 hours at temperatures between about 120° C. and about 175° C. are suitably employed. The baking step is utilized to minimize swelling or distorting of the friction member which otherwise might occur if the friction assembly is immediately placed in use under high temperature conditions.

It will be understood that the curing or thermosetting of phenol-aldehyde resins is a function of heat, time and pressure and also varied with the resin composition. The curing conditions recited herein are typical of those utilized for phenol-aldehyde resins; however, changes in heat, time, or pressure may be made, as well as changes in the amounts of catalyst, may affect the curing conditions. The criteria of the present invention is that the preform conditions do not substantially cure the resin composition and that the final molding conditions do substantially cure the resin composition.

The following example is illustrative of the present invention and is not to be construed as limiting. Unless otherwise noted, all percents are in percent by weight, and all temperatures are in degrees Centigrade.

EXAMPLE

A straight side, positive mold for a vehicular brake friction pad was prepared and preheated to about 170° C. A mixture of phenol-formaldehyde resin containing about 20 percent resin, about 50 percent powdered iron and about 30 percent of other filler materials was charged into the mold. A pressure of about 30,000 psi was applied to the resin composition for a period of about 5 seconds.

The mold was opened and the preformed friction member retained therein. The mold containing the preformed friction member was then utilized as a portion of a second mold having the capacity of a support member. A charge of nodular phenol-formaldehyde resin molding composition was added to the mold, sufficient to mold the support member. The resin composition was comprised of about 37 percent phenol-formaldehyde resin, about 30 percent wollastonite, about 15 percent cotton flock, about 10 percent chopped glass fiber, and about 8 percent processed mineral fiber.

The composite mold was then closed, a temperature of about 170° C. was maintained while a pressure of about 20,000 psi was applied for a time of 3 minutes.

The composite article was then removed from the mold and stabilized by placing the assembly in an enclosure heated to a temperature of about 150° C. for a period of 12 hours.

Although the present invention has been described with certain specific embodiments, it is to be understood that modifications and variations may be made without departing from the spirit and scope of the invention, as those of ordinary skill in the art will readily understand. Such modifications and variations are considered to be within the purview and scope of the appended claims.

What is claimed is:

1. A composite friction assembly comprised of a friction member and a support member,
   (a) said friction member containing from about 10 to about 30 percent by weight of a phenol-aldehyde resin and from about 70 to about 90 percent by weight filler material, said filler material being predominantly metallic or asbestos,
   (b) said support member containing from about 20 to about 50 percent by weight of a phenol-aldehyde resin and from about 50 to about 80 percent by weight filler material,
   (c) said friction member having been separately preformed under conditions less stringent than those conditions required to thermoset the resin component thereof,
   (d) said friction member joined along at least one surface thereof to said support member by the common curing of the resin components of said friction member and said support member.

2. The assembly of claim 1 wherein the phenol-aldehyde resin is phenol-formaldehyde.

3. The assembly of claim 1 wherein the metal in said friction member is in the form of powder.

4. The assembly of claim 1 wherein the assembly is a brake assembly.

5. The assembly of claim 1 wherein the assembly is a clutch assembly.

6. The assembly of claim 1 wherein the assembly includes a plurality of friction members.

7. In a brake or clutch assembly comprising a friction member and a support member,
   the improvement wherein said friction member and said support member form a composite friction assembly wherein:
   (a) said friction member contains from about 10 to about 30 percent by weight of a phenol-aldehyde resin and from about 70 to about 90 percent by weight filler material, said filler material being predominantly metallic or asbestos,
   (b) said support member contains from about 20 to about 50 percent by weight of a phenol-aldehyde resin and from about 50 to about 80 percent by weight filler material,
   (c) said friction member has been separately preformed under conditions less stringent than those conditions required to thermoset the resin component thereof,
   (d) said friction member is joined along at least one surface thereof to said support member by the common curing of the resin components of said friction member and said support member.

8. The assembly of claim 7 wherein the phenol-aldehyde resin is phenol-formaldehyde.

9. The assembly of claim 7 wherein the metal in said friction member is in the form of powder.

10. The assembly of claim 7 wherein the assembly includes a plurality of friction members.

11. A method of producing a composite friction assembly comprising a friction member and a support member which comprises the steps of:
    (a) charging a mold having the capacity of said friction member with a mixture of thermosetting phenol-aldehyde resin and filler material,
    (b) forming a friction member in said mold under conditions less stringent than those which would substantially thermoset the resin component of said member,
    (c) charging a second mold with a mixture of a thermosetting phenol-aldehyde resin and filler material, wherein such second mold has the capacity of said support member and utilizes a face of the preformed friction member as an internal portion thereof, (d) molding said support member under conditions to thermoset the resin components of both members and produce a composite assembly.

12. The method of claim 11 wherein the product from step (d) is baked at a temperature of between about 120° C. and about 175° C. for a period between about 9 and about 15 hours.

13. The method of claim 11 wherein the phenol-aldehyde resin is phenol-formaldehyde.

14. The method of claim 11 wherein the mixture in step (a) contains from about 70 to about 90 percent by weight filler material which is predominantly metallic or asbestos.

15. The method of claim 11 wherein step (b) is carried out at pressures between about 20,000 and about 50,000 psi.

16. The method of claim 11 wherein step (d) is carried out at pressures between about 4,000 to about 50,000 psi.

17. The method of claim 11 wherein the assembly is a brake assembly.

18. The method of claim 11 wherein the assembly is a clutch assembly.

19. The method of claim 11 wherein the assembly includes a plurality of friction members.

* * * * *